United States Patent
Banholzer et al.

(10) Patent No.: US 6,499,352 B2
(45) Date of Patent: Dec. 31, 2002

(54) PRESSURE MEASURING CELL

(75) Inventors: Karlheinz Banholzer, Hausen (DE); Karl Flögel, Schopfheim (DE); Frank Hegner, Lörrach (DE); Bernd Rosskopf, Schopfheim (DE)

(73) Assignee: Endress + Hauser GmbH + Co., Maulburg (DE)

( * ) Notice: Subject to any disclaimer, the term of this patent is extended or adjusted under 35 U.S.C. 154(b) by 0 days.

(21) Appl. No.: 09/931,760

(22) Filed: Aug. 20, 2001

(65) Prior Publication Data

US 2002/0040605 A1 Apr. 11, 2002

(30) Foreign Application Priority Data

Oct. 10, 2000 (DE) .......................... 100 50 300

(51) Int. Cl.$^7$ .............................. G01L 7/08
(52) U.S. Cl. ...................................... 73/715
(58) Field of Search .................. 73/706, 708, 715–727, 73/756; 361/283.1–283.4

(56) References Cited

U.S. PATENT DOCUMENTS

| | | |
|---|---|---|
| 4,370,890 A | 2/1983 | Frick |
| 4,754,365 A | 6/1988 | Kazahaya |
| 5,157,972 A | 10/1992 | Broden et al. |

FOREIGN PATENT DOCUMENTS

| | | |
|---|---|---|
| DE | 3312385 A1 | 10/1983 |
| DE | 3820418 A1 | 12/1988 |
| DE | 3821693 A1 | 5/1989 |
| DE | 4207949 C1 | 4/1993 |

*Primary Examiner*—William Oen
(74) *Attorney, Agent, or Firm*—Jones, Tullar & Cooper, P.C.

(57) ABSTRACT

A ceramic pressure measuring cell with a basic body (1, 3), a diaphragm (5) connected to the basic body (1, 3) to form a measuring chamber (7, 9), which during operation undergoes a deflection dependent on a pressure ($p_1$–$p_2$) to be measured and the deflection of which is registered by means of an electromechanical transducer and is made accessible for further evaluation and/or processing, and a bore (13, 17) which penetrates the basic body (1, 3) and into which a small pressure tube (15, 19) is soldered in a pressure-resistant and gastight manner, and via which a pressure ($p_1$, $p_2$) is introduced into the measuring chamber (7, 9), is provided, in which a volume inside the measuring cell and the small pressure tube is precisely known, since the mechanical stop (33, 35) fixes a depth of penetration of the small pressure tube (15, 19) into the basic body (1, 3).

7 Claims, 1 Drawing Sheet

PRESSURE MEASURING CELL

Figure 1:
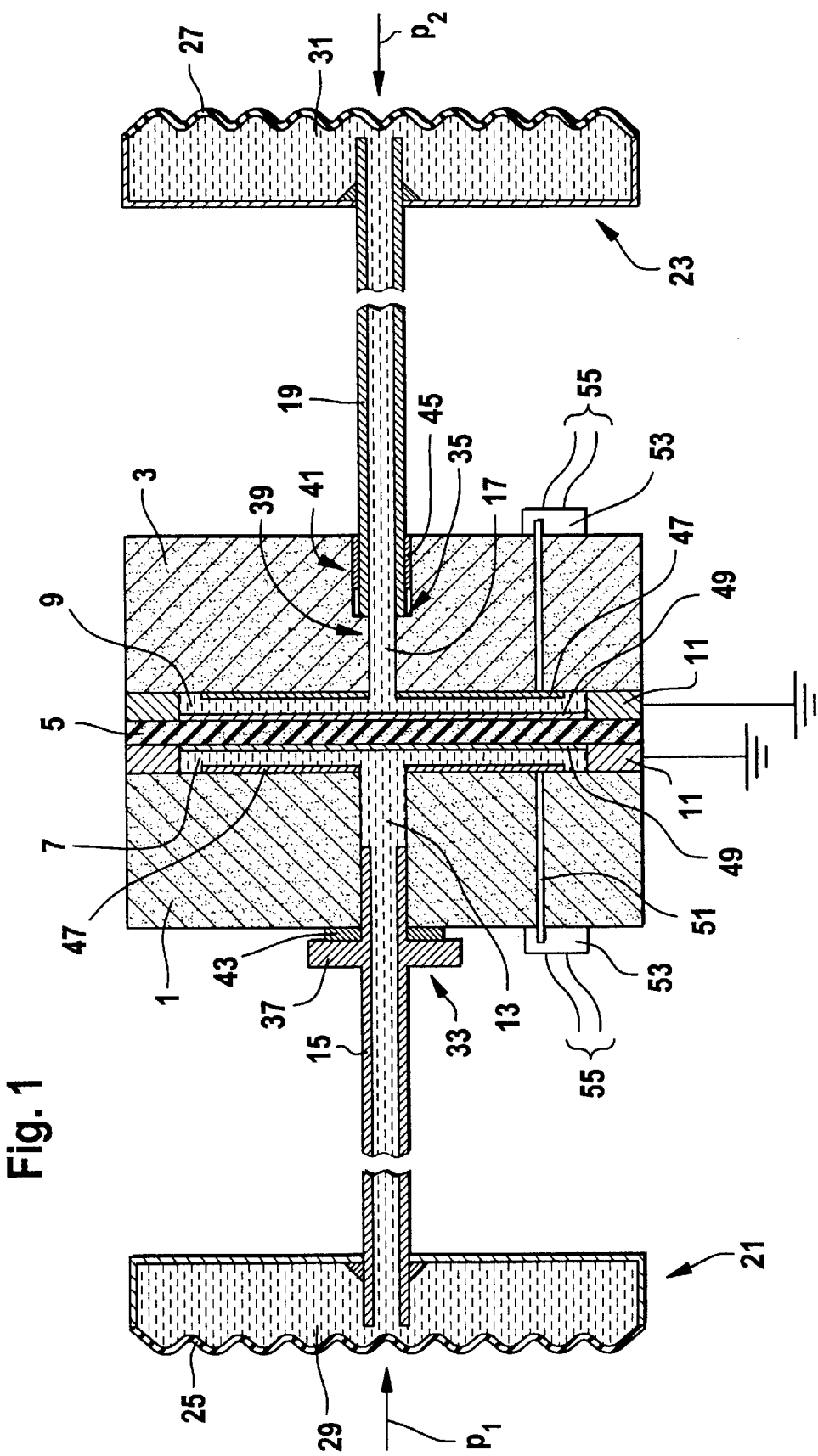

The invention relates to a ceramic pressure measuring cell.

In pressure measurement, absolute-pressure, relative-pressure and differential-pressure measuring cells are used for example. In the case of absolute-pressure measuring cells, a pressure to be measured is registered in absolute terms, i.e. as a pressure difference with respect to a vacuum. With a relative-pressure measuring cell, a pressure to be measured is picked up in the form of a pressure difference with respect to a reference pressure, for example a pressure which prevails where the sensor is located. In most applications, this is the atmospheric pressure at the place of use. Consequently, in the case of absolute-pressure measuring cells, a pressure to be measured is sensed in relation to a fixed reference pressure, the vacuum pressure, and in the case of relative-pressure measuring cells a pressure to be measured is sensed in relation to a variable reference pressure, for example the ambient pressure. A differential-pressure measuring cell senses a difference between a first pressure and a second pressure bearing on the measuring cell.

There are on the market ceramic pressure measuring cells with a basic body
  a diaphragm connected to the basic body to form a measuring chamber,
  which during operation undergoes a deflection dependent on a pressure to be measured, and
  an electromechanical transducer, which serves the purpose of registering the deflection of the diaphragm and making it accessible for further evaluation and/or processing.

Ceramic pressure measuring cells are advantageously used for pressure measurement, since ceramic pressure measuring cells have a measuring accuracy which is stable over a very long time. One reason for this is the strong ionic bonding of ceramic, which makes the material very durable and undergo virtually no aging in comparison with other materials, for example metals.

Ceramic pressure measuring cells have so far usually been designed as what are known as dry absolute- or relative-pressure measuring cells. A dry pressure measuring cell is not filled with a liquid which transfers a pressure, for example into a measuring chamber of the pressure measuring cell. The pressure measuring cell is restrained at an outer edge in a housing, with a seal interposed. A pressure to be measured is fed to the diaphragm through an opening in the housing or a process connection connected to the generally metallic housing. A pressure to be measured can only be fed directly to such measuring cells. The use for example of an upstream diaphragm seal is usually not envisaged in the case of these pressure measuring cells.

It is possible to feed the pressure to the measuring chamber via a small pressure tube which has been fitted, for example cemented or soldered, into the basic body. A soldered-in small pressure tube provides an elastomer-free, hermetically sealed joint for the pressure measuring cell. The small pressure tube and the measuring chamber, and also a pressure source, for example a diaphragm seal, arranged upstream of the small pressure tube, are filled with a liquid.

In the case of such liquid-filled pressure measuring cells, it is of advantage for their measuring accuracy that the volume of liquid is as small as possible. The reason for this essentially lies in a thermal expansion of the liquid as a function of temperature, which leads to a change in the internal pressure in the pressure measuring cell and consequently to a change in its measuring properties.

During the calibration of the pressure measuring cells, it is of advantage if the required volume of liquid is as identical as possible from one measuring cell to the other. The more the pressure measuring cells to be calibrated are the same, the less effort is required for example for determining the characteristic data of the measuring cells.

Pressure measuring cells which serve for measuring a pressure difference typically have two identically formed halves, which are each connected to a pressure source. In the case of these pressure measuring cells, it is important not only that each half requires as small a volume of liquid as possible but also that the required volume of liquid in both halves is as identical as possible. One reason for this is that different volumes result in a different change in volume in the two halves when there is a change in temperature. This can lead to considerable temperature-dependent measuring errors.

It is an object of the invention to specify a ceramic pressure measuring cell in which a pressure is fed to the measuring chamber by means of a small metallic pressure tube and in which a volume inside the measuring cell and the small pressure tube can be established as reproducibly as possible.

For this purpose, the invention comprises a ceramic pressure measuring cell with a basic body
  a diaphragm connected to the basic body to form a measuring chamber,
  which during operation undergoes a deflection dependent on a pressure to be measured,
  an electromechanical transducer, which serves the purpose of registering the deflection of the diaphragm and making it accessible for further evaluation and/or processing, and
  a bore which penetrates the basic body
  and into which a small pressure tube is soldered in a pressure-resistant and gastight manner,
  and via which a pressure is introduced into the measuring chamber, and
  a mechanical stop, by which a depth of penetration of the small pressure tube into the basic body is fixed.

According to a first embodiment, the stop is a shoulder which is formed onto the small pressure tube, extends radially outward and rests on an annular face of the basic body surrounding the bore.

According to a second embodiment, the bore has a portion facing the measuring chamber and a portion facing away from the measuring chamber, the portion facing the measuring chamber having an inside diameter which is smaller than an outside diameter of the small pressure tube and is an inside diameter of the portion facing away from the measuring chamber, and between the two portions there is an annular face, which forms the stop and on which the small pressure tube rests with an annular end face.

According to one embodiment, the solder is a glass solder.

According to another embodiment, the solder is a metallic hard solder and the ceramic basic body has a pre-metallization at a connecting point between the basic body and the small pressure tube.

According to a further embodiment, the solder is an active hard solder.

The stop achieves the effect that a depth of penetration of the small pressure tube into the basic body is precisely predetermined. In a corresponding way, a volume which displaces the small pressure tube in the bore in the basic body can be established in a reproducible manner. Together with an internal volume of the measuring chamber known from its dimensions, the internal volume of the pressure measuring cell can consequently be established in a reproducible manner.

The invention and further advantages are now explained in more detail with reference to the figure of the drawing, in which an exemplary embodiment is represented.

FIG. 1 shows a section through a pressure measuring cell according to the invention.

FIG. 1 shows a section through a ceramic pressure measuring cell according to the invention. It is designed as a differential-pressure measuring cell and has a first basic body 1 and a second basic body 3. Arranged between the first basic body 1 and the second basic body 3 is a diaphragm 5. The diaphragm 5 is connected to the first basic body 1 to form a first measuring chamber 7 and is connected to the second basic body 3 to form a second measuring chamber 9.

The diaphragm 5 and the first and second basic bodies 1, 3 consist of ceramic. The first and second basic bodies 1, 3 are each connected to the diaphragm 5 by a joint 11, for example by means of an active hard solder, such as for example a zirconium-iron-titanium-beryllium solder, at a respectively outer annular edge.

During operation, a first pressure $p_1$ prevails in the first measuring chamber 7 and a second pressure $p_2$ prevails in the second measuring chamber 9. The deflection of the diaphragm 5 depends on a pressure to be measured, which corresponds to the difference between the first pressure $p_1$ and the second pressure $p_2$.

For feeding in the pressure, the first basic body 1 has a continuous bore 13, which leads into the measuring chamber 7 and into which a first small pressure tube 15 is fitted. During operation, the first pressure $p_1$ is fed to the measuring chamber 7 via the first small pressure tube 15. In an analogous way, the second basic body 3 has for feeding in the pressure a continuous bore 17, which leads into the measuring chamber 9 and into which a second small pressure tube 19 is fitted. During operation, the second pressure $p_2$ is fed to the measuring chamber 9 via the small pressure tube 19.

In the exemplary embodiment shown, the small pressure tubes 15, 19 are each connected to a diaphragm seal 21, 23. The diaphragm seals 21, 23 each have a separating diaphragm 25, 27, which in each case covers a chamber 29, 31. The first pressure $p_1$ acts from the outside on the separating diaphragm 25 and the second pressure $p_2$ acts from the outside on the second separating diaphragm 27. The chambers 29, 31, the small pressure tubes 15, 19 and the measuring chambers 7, 9 are filled with a liquid which is as incompressible as possible, for example a silicone oil. The liquid has the effect of transferring the first and second pressures $p_1$, $p_2$ acting on the separating membranes 25, 27 from the outside into the assigned first and second measuring chambers 7, 9, respectively, where they act on in each case one side of the diaphragm 5.

A mechanical stop 33 is provided, fixing a depth of penetration of the first small pressure tube 15 into the basic body 1. A mechanical stop 35 is also provided, fixing a depth of penetration of the second small pressure tube 19 into the second basic body 3.

The depth of penetration of a small pressure tube can be fixed by means of a stop in various ways. Therefore, two configurations of a mechanical stop are represented in FIG. 1 by way of example. Other forms of a mechanical stop which prevent further penetration of the small pressure tube by means of a mechanical barrier can likewise be used.

In the case of the first configuration, the stop 33 comprises a shoulder 37 which is formed onto the small pressure tube 15, extends radially outward and rests on an annular face of the basic body surrounding the bore 13 and facing away from the diaphragm.

In the case of the second configuration represented, the bore 17 has a portion 39 facing the measuring chamber and a portion 41 facing away from the measuring chamber. The portion 39 facing the measuring chamber has an inside diameter which is smaller than an outside diameter of the small pressure tube 19 and is an inside diameter of the portion 41 facing away from the measuring chamber. Between the two portions 39, 41 there is an annular face, which forms the stop 35. The small pressure tube 19 rests on the annular face with an annular end face.

The small pressure tubes 15, 19 consist of metal, for example of a high-grade steel, tantalum or a nickel-iron-cobalt alloy, as is commercially available for example under the product name Kovar, and have been soldered into the respective bore 13, 17 in a pressure-resistant and gastight manner by means of a solder 43, 45.

In the case of the first configuration, the solder 43 has been applied in an annular form between the shoulder 37 and the first basic body 1. In the case of the second configuration, the solder 45 has been introduced into an annular-cylindrical gap between the small pressure pipe 19 and the bore 17. Alternatively, in the case of the first configuration, the solder could also have been introduced into an annular-cylindrical gap between the small pressure tube 15 and the bore 13.

Suitable with preference as the solder 43, 45 are a glass solder, a metallic hard solder or an active hard solder, for example a silver-copper active hard solder.

If a metallic hard solder is used, the ceramic basic body is provided at a connecting point between the basic body and the small pressure tube with a pre-metallization, for example of molybdenum-manganese with a nickel coating. Suitable for example as the solder is a silver-copper hard solder applied to the pre-metallization.

The soldering operation takes place for example in an oven under a vacuum or in an inert-gas atmosphere.

The stops 33, 35 offer the advantage during soldering that the required amount of solder can be apportioned and positioned very accurately, since the position of the respective small pressure tube 15, 19 in the respective bore 13, 17 is precisely fixed. As a result, a very high-grade, and consequently unrestrictedly gastight and mechanically stable, in particular very pressure-resistant, connection is made possible.

The pressure measuring cells can therefore withstand very high pressures, for example 40,000 kPa (400 bar).

During operation, the diaphragm 5 undergoes a deflection, which depends on the pressure to be measured, here the difference between the first pressure $p_1$ and the second pressure $p_2$. The deflection is registered by means of an electromagnetic transducer.

In the exemplary embodiment shown, the electromechanical transducer has an electrode 47 which has been applied to an inner surface of the first basic body 1 facing the diaphragm and, together with a counterelectrode 49 applied to the diaphragm 5, forms a capacitor, the capacitance of which is a measure of the deflection of the diaphragm 5.

The counterelectrode 49 adjoins the joint 11 with its outer edge in an electrically conducting manner and is preferably connected via the joint 11 to ground or to a fixed reference potential.

Since the exemplary embodiment represented concerns a differential-pressure measuring cell, an identically constructed electromechanical transducer is preferably provided in the second measuring chamber 9, as represented in FIG. 1.

In the case of such capacitive transducers, the stop 33 offers the further advantage that there is no possibility of the small pressure tube 15 penetrating into the measuring chamber 7 and producing a short circuit there between the electrode 47 and the counterelectrode 49. Such a short circuit would lead to a total failure of the measuring cell.

The basic body 1 has a continuous bore, to which a metallic contact pin 51 has been led. The electrode 47 is electrically connected by means of the contact pin 51 for measuring the capacitance. For this purpose, a first end of the contact pin 51 is connected in an electrically conducting manner to the electrode 47. A remaining second end protrudes out of the basic body 1 and is led in the exemplary embodiment shown to an electronic circuit 53, arranged on the basic body 1.

The electronic circuit 53 converts the changes in capacitance of the capacitor into an electrical output signal, for example into a correspondingly changing electrical voltage. The output signal is available for further processing and/or evaluation via connection lines 55.

The second basic body 3 likewise has such a plated-through hole, via which the electromechanical transducer arranged in the second measuring chamber 9 is connected to an electronic circuit 53. The difference between the capacitances of the two electromechanical transducers is preferably determined and the differential pressure is ascertained from it. In FIG. 1, a differential-pressure measuring cell is represented. A relative-pressure or absolute-pressure measuring cell may also be constructed in an analogous way. In the case of a relative-pressure measuring cell, the first pressure $p_1$ would correspond for example to a pressure to be measured and the second pressure $p_2$ would correspond to a reference pressure, to which the pressure to be measured is related. Of course, instead of the diaphragm seal 23 connected to it, the second measuring chamber 9 may also be provided with a reference-pressure feed, for example a bore which penetrates the basic body 3 and through which a pressure prevailing in the ambience acts on the second measuring chamber 9.

An absolute-pressure measuring cell is obtained in an analogous way, by evacuating and hermetically sealing the second measuring chamber 9, instead of connecting it to a diaphragm seal 23.

What is claimed is:

1. A ceramic pressure measuring cell with
   a basic body (1, 3)
   a diaphragm (5) connected to the basic body (1, 3) to form a measuring chamber (7, 9),
   which during operation undergoes a deflection dependent on a pressure ($p_1$–$p_2$) to be measured,
   an electromechanical transducer, which serves the purpose of registering the deflection of the diaphragm (5) and making it accessible for further evaluation and/or processing, and
   a bore (13, 17) which penetrates the basic body (1, 3) and into which a small pressure tube (15, 17) is mounted in a pressure-resistant and gastight manner,
   and via which a pressure ($p_1$, $p_2$) is introduced into the measuring chamber (7, 9), and
   a mechanical stop (33, 35), by which a depth of penetration of the small pressure tube (15, 19) into the basic body (1, 3) is fixed.

2. The pressure measuring cell as claimed in claim 1, in which the stop (33) is a shoulder (37) which is formed onto the small pressure tube (15), extends radially outward and rests on an annular face of the basic body (1) surrounding the bore (13).

3. The pressure measuring cell as claimed in claim 1, in which
   the bore (17) has a portion (39) facing the measuring chamber and a portion (41) facing away from the measuring chamber,
   the portion (39) facing the measuring chamber has an inside diameter which is smaller than an outside diameter of the small pressure tube (19) and is an inside diameter of the portion (41) facing away from the measuring chamber, and in which between the two portions (39, 41) there is an annular face,
   which forms the stop (35) and
   on which the small pressure tube (19) rests with an annular end face.

4. The pressure measuring cell according to claim 1, wherein the small pressure tube is mounted by soldering.

5. The pressure measuring cell as claimed in claim 4, in which the solder is a glass solder.

6. The pressure measuring cell as claimed in claim 1, in which the solder is a metallic hard solder and the ceramic basic body (1, 3) has a pre-metallization at a connecting point between the basic body (1, 3) and the small pressure tube (15, 19).

7. The pressure measuring cell as claimed in claim 1, in which the solder is an active hard solder.

* * * * *